Patented Apr. 24, 1934

1,956,425

UNITED STATES PATENT OFFICE 1,956,425

FLAKED VEGETABLE TISSUE FOR EXTRACTION AND METHOD OF MAKING THE SAME

Ronald B. McKinnis, Pittsburgh, Pa., assignor to Continental Can Company, Inc., New York, N. Y., a corporation of New York No Drawing. Application February 11, 1933, Serial No. 656,387

3 Claims. (Cl. 87—28)

The invention relates to new and useful improvements in a woody fiber product prepared for extraction and the method of preparing the same.

An object of the invention is to provide a woody fiber product for extraction so that with certain drug products, the usual preliminary maceration is rendered unnecessary.

A further object of the invention is to provide a woody fiber product for extraction so that the danger of impeding the flow of the extracting liquid during percolation through the swelling of the product is greatly reduced.

A still further object of the invention is to provide a woody fiber for extraction so that the time and volume of solvent required for extraction is greatly reduced and the degree of concentration of the extractives increased.

A still further object of the invention is to provide a method whereby a woody fiber may be reduced to the form of coherent flakes of such uniform thinness as to render the soluble ingredients thereof equally and quickly accessible to an extracting liquid.

These and other objects will in part be obvious and will in part be hereinafter more fully disclosed.

The invention is directed to the preparation of a woody fiber product for extraction purposes and the method of producing the product. The term "woody fiber products" includes the stem and/or the bark of above or underground portions of annual, biennial and perennial plants and the entire structure of the roots themselves. The terms "annual", "biennial" and "perennial" may apply to the entire plant or to the above ground stem thereof, and may include the stems of herbaceous plants, shrubs and trees. It is well known that these woody fiber products are used in the manufacture of infusions, decoctions, tinctures and fluid and solid extracts, which are of great value as medicines, and also in connection with food products and beverages.

Considerable difficulty has been experienced in the production of the extractives in an efficient manner. In connection with certain of the products, a preliminary maceration is necessary, and is prescribed by the U. S. Pharmacopoeia. Then again, the woody fibers when prepared for percolation, often swell and impede the flow of the extracting liquid through the percolator. Then again the volume of the solvent required for extraction is quite excessive, which when alcohol, glycerine or such extracting liquids are used, is expensive. Furthermore, it often occurs that the volume of weak percolate collected after the reserve percolate has been set aside is of considerable volume, and time is required for concentrating the same with the incident danger of decomposing extractives under the influence of heat thereon. The purpose of the present invention is to prepare the woody fibers for infusion, decoction, maceration and percolation so as to avoid the objections stated above. This has been accomplished by reducing the woody fibers to the form of firm coherent flakes of such thinness as to render all of the soluble ingredients readily accessible to the extracting liquid. I have found it expedient to reduce the woody fibers to approximately a thinness of .001 of an inch. This is accomplished by the breaking of the woody fibers into particles, the tempering of the particles to render them pliable and the subjecting of the same to pressure. The flakes are produced by a plastic flow within the particles, so that these particles are simultaneously made thinner and increased in area, rupturing many of the cells but without completely disintegrating the fibers. The flake thus formed is of such thinness that all of the soluble ingredients are rendered substantially equally accessible to the extracting liquid, and the extraction takes place in certain products almost instantly. The flakes are irregular in outline, and as to size may vary in any diameter from one-sixteenth to three-eighths of an inch, depending upon the product being prepared and the size of the particles which are reduced to flake form. When the product to be extracted is reduced to the flake form described, the preliminary maceration required with certain products is found unnecessary. When the flakes are used in a percolator, they overlie and overlap, and any swelling of the flakes is generally in a lateral direction and this does not appreciably restrict the flow of the solvent. Inasmuch as the soluble ingredients are all rendered readily and equally accessible to the extracting liquid, the volume of the solvent required for extraction is greatly reduced, which is of great advantage when alcohol and glycerine, or mixtures of water, alcohol and glycerine are used, and whether the extraction is effected by maceration or percolation. Then again, when the product is reduced to this flaked form described, the degree of concentration of the extractives commonly referred to as the reserve percolate is greatly increased, due to the fact that all of the soluble ingredients have been rendered readily accessible to the extracting liquid. The volume of the weak percolate collected after the reserve percolate has been set aside, is also greatly reduced by reason of this quick and ready access of the extracting liquid to the soluble ingredients. This reducing of the weak percolate decreases the time required for concentration, and also minimizes the danger of decomposing the extractives by the heat applied to the weak percolate for the concentrating of the same.

Perhaps a better understanding of the product and the method will be obtained from a specific illustration of the application thereof. For the manufacture of fluid extract or tincture of cinchona, the bark of cinchona is broken, coarsely ground and tempered, or the bark may be first tempered and then broken. It is broken for the purpose of reducing it to comparatively small particles, and it is tempered for the purpose of rendering the woody fibers pliable and plastic. This tempering of the cinchona bark may be accomplished by applying a spray of water or jet of steam to the particles of the bark, or the bark may be tumbled in a warm room or a container, the atmosphere of which is saturated with water vapor. The cinchona bark will slowly absorb the moisture and become pliable. One or two days may be necessary for uniformly completing the tempering thereof. Only enough moisture is introduced by this humidifying process to cause the woody particles to flow into flake form under the extreme pressure produced by the rolls. The finished flakes are not wet, but are dry, and contain little moisture in excess of that present in the unground or unflaked woody particles. Therefore, the flaked woody fibers may be kept indefinitely, and may be extracted in any type of percolating apparatus. The same treatment would be given to other woody fibers for rendering the same pliable before flaking. These pliable particles of the woody fiber are then passed between heated rolls which are so disposed relative to each other as to reduce the particles to the form of a flake of substantially uniform thinness, and of such thinness as to render the soluble ingredients thereof quickly and easily accessible to the extracting liquid. The same treatment which has been applied to the cinchona bark may be applied to other products, such as wild cherry bark, cascara bark, quassia wood and belladonna root, and many other products. The ones mentioned are examples to give a better idea of the scope to which the invention may be applied. The essential features of the method are the tempering of the woody fibers in order to render them pliable, and the reducing of the same to relatively small particles, so that these particles may be in turn reduced to the form of thin flakes of such a thinness as to accomplish the results described above in connection with extraction and also of such dimensions as to render more efficient the treating of the same by maceration, percolation, infusion or decoction. The rolls are preferably heated, and this gives firmness to the flake, holding it intact and preventing it from crumbling, so that the extractives produced are clear and without sediment.

Instead of the use of heated rolls for the producing of the flakes, pressure may be used in other ways, and the method may be greatly varied for producing the flakes without departing from the spirit of the invention as set forth in the appended claims.

Having thus described the invention, what I claim as new and desire to secure by Letters Patent, is:—

1. A dry woody fiber product containing substantially all of its original extractable matter consisting of woody fibers in the form of firm individual flakes, each having a coherent crushed fibrous structure containing many of the cells in a ruptured state and with the tissues thereof only partly disintegrated, which flakes are of such uniform thinness as to render the soluble ingredients thereof substantially equally accessible to an extracting liquid.

2. The method of preparing for extraction a dry woody fiber product containing substantially all of its original extractible matter which consists in breaking the fibers into relatively small particles, tempering the woody fibers by subjecting the same to moisture in amount only sufficient to render said particles pliable and applying pressure to the particles for displacing the cells and reducing the particle to the form of firm individual flakes having coherent crushed fibrous structure of such uniform thinness as to render all of the cells thereof substantially equally accessible to an extracting liquid.

3. The method of preparing for extraction a dry woody fiber product containing substantially all of its original extractible matter which consists in breaking the fibers into relatively small particles, tempering the woody fibers by subjecting the same to moisture in amount only sufficient to render the same pliable and passing the tempered particles between heated rolls for displacing the cells and reducing said particles to the form of firm individual flakes having a coherent crushed fibrous structure of such uniform thinness that the soluble ingredients thereof are substantially equally accessible to an extracting liquid.

RONALD B. McKINNIS.